US011457427B2

(12) United States Patent
Sharma et al.

(10) Patent No.: US 11,457,427 B2
(45) Date of Patent: *Sep. 27, 2022

(54) TO REDUCE POWER CONSUMPTION FOR ALL TYPES OF TERMINAL DEVICE

(71) Applicant: Sony Corporation, Tokyo (JP)

(72) Inventors: Vivek Sharma, Basingstoke (GB); Shin Horng Wong, Basingstoke (GB); Martin Warwick Beale, Basingstoke (GB); Samuel Asangbeng Atungsiri, Basingstoke (GB)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/241,700

(22) Filed: Apr. 27, 2021

(65) Prior Publication Data

US 2021/0250903 A1    Aug. 12, 2021

Related U.S. Application Data

(63) Continuation of application No. 16/763,995, filed as application No. PCT/EP2018/081383 on Nov. 15, 2018, now Pat. No. 11,012,975.

(30) Foreign Application Priority Data

Nov. 15, 2017  (EP) .................................. 17201973

(51) Int. Cl.
*H04W 52/02*  (2009.01)
*H04W 68/02*  (2009.01)

(52) U.S. Cl.
CPC ..... *H04W 68/025* (2013.01); *H04W 52/0219* (2013.01); *H04W 52/0235* (2013.01)

(58) Field of Classification Search
CPC .......................... H04W 68/005; H04W 68/025
See application file for complete search history.

(56) References Cited

U.S. PATENT DOCUMENTS

| 9,596,651 | B2 | 3/2017 | Jafarian et al. |
| 11,166,237 | B2 * | 11/2021 | Selvaganapathy .......................... H04W 52/0235 |
| 2012/0275364 | A1 | 11/2012 | Anderson et al. |
| 2018/0332533 | A1 | 11/2018 | Bhattad et al. |
| 2019/0150114 | A1 | 5/2019 | Liu et al. |

FOREIGN PATENT DOCUMENTS

WO    2019/030337 A1    2/2019

OTHER PUBLICATIONS

International Search Report and Written Opinion dated Feb. 26, 2019 for PCT/EP2018/081383 filed on Nov. 15, 2018, 9 pages.

(Continued)

*Primary Examiner* — Michael T Vu
(74) *Attorney, Agent, or Firm* — Xsensus LLP

(57) ABSTRACT

A method of operating a terminal device and a plurality of network access nodes, wherein the method comprises: establishing first wake-up signalling configuration information for a first network access node; establishing second wake-up signalling configuration information for a second network access node; and monitoring for signalling transmitted by the first network access node in accordance with the first wake-up signalling format and monitoring for signalling transmitted by the second network access node in accordance with the second wake-up signalling format, and seeking to decode a subsequent paging message in response to detecting wake-up signalling in accordance with either the first wake-up signalling format or the second wake-up signalling format.

18 Claims, 6 Drawing Sheets

(56) References Cited

OTHER PUBLICATIONS

Ericsson, "Revised WID for Further Enhanced MTC for LTE," 3GPP TSG RAN Meeting #73, RP-161464, revision of RP-161321, New Orleans, USA, Sep. 19-22, 2016, 6 pages.

Huawei and Hisilicon, "Revised work item proposal: Enhancements of NB-IoT," 3GPP TSG RAN Meeting #73, RP-161901, revision of RP-161324, New Orleans, USA, Sep. 19-22, 2016, 8 pages.

Ericsson and Qualcomm, "New WID on Even further enhanced MTC for LTE," 3GPP TSG RAN Meeting #75, RP-170732, revision of RP-170465, Dubrovnik, Croatia, Mar. 6-9, 2017, 4 pages.

Huawei et al., "New WID on Further NB-IoT enhancements," #3GPP TSG RAN Meeting #75, RP-170852, Dubrovnik, Croatia, Mar. 6-9, 2017, 6 pages.

Holma, H. and Toskala, A, "LTE for UMTS OFDMA and SC-FDMA based radio access", John Wiley and Sons, 2009, pp. 25-27.

3GPP, "LTE; Evolved Universal Terrestrial Radio Access (E-UTRA); User Equipment (UE) procedures in idle mode," FS 36.304, version 14.2.0, Release 14, Apr. 2017, pp. 1-51.

3GPP, "LTE; Evolved Universal Terrestrial Radio Access (E-UTRA); Medium Access Control (MAC) protocol specification," TS 36.321, version 13.5.0, Release 13, Apr. 2017, pp. 1-95.

3GPP, "LTE; Evolved Universal Terrestrial Radio Access (E-UTRA); Medium Access Control (MAC) protocol specification," TS 36.321, version 12.5.0, Release 12, Apr. 2015, pp. 1-78.

Hambeck, C., et al., "A 2.4 Wake-up Receiver for Wireless Sensor Nodes with −71dBm Sensitivity," IEEE Proceeding International Symposium of Circuits and Systems (ISCAS), 2011, pp. 534-537.

\* cited by examiner

TO REDUCE POWER CONSUMPTION FOR ALL TYPES OF TERMINAL DEVICE

CROSS-REFERENCE TO RELATED APPLICATIONS

This application is a continuation of U.S. application Ser. No. 16/763,995, filed May 14, 2020, which is based on PCT filing PCT/EP2018/081383, filed on Nov. 15, 2018, and claims priority to EP 17201973.9, filed Nov. 15, 2017, the entire contents of each are incorporated herein by reference.

BACKGROUND

Field

The present disclosure relates to telecommunications apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support a wide range of devices associated with different operating characteristics, for example in terms of frequency of communications and requirements for low power usage.

One example area of current interest in this regard includes the so-called "The Internet of Things", or IoT for short. The 3GPP has proposed in Release 13 of the 3GPP specifications to develop technologies for supporting narrowband (NB)-IoT and so-called enhanced MTC (eMTC) operation using a LTE/4G wireless access interface and wireless infrastructure. More recently there have been proposals to build on these ideas in Release 14 of the 3GPP specifications with so-called enhanced NB-IoT (eNB-IoT) and further enhanced MTC (feMTC), and in Release 15 of the 3GPP specifications with so-called further enhanced NB-IoT (feNB-IoT) and even further enhanced MTC (efeMTC). See, for example, [1], [2], [3], [4]. At least some devices making use of these technologies are expected to be low complexity and inexpensive devices requiring relatively infrequent communication of relatively low bandwidth data. Low power consumption may be a particularly important consideration for these types of device, for example because they are small devices having correspondingly small batteries or because they remotely located without ready access to external power. While a desire for low power consumption may be a particularly important consideration for such devices compared to other devices, it will nonetheless be appreciated that approaches that help reduce power consumption can be useful for all types of terminal device.

SUMMARY

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DESCRIPTION OF EXAMPLE EMBODIMENTS

Figure 1:
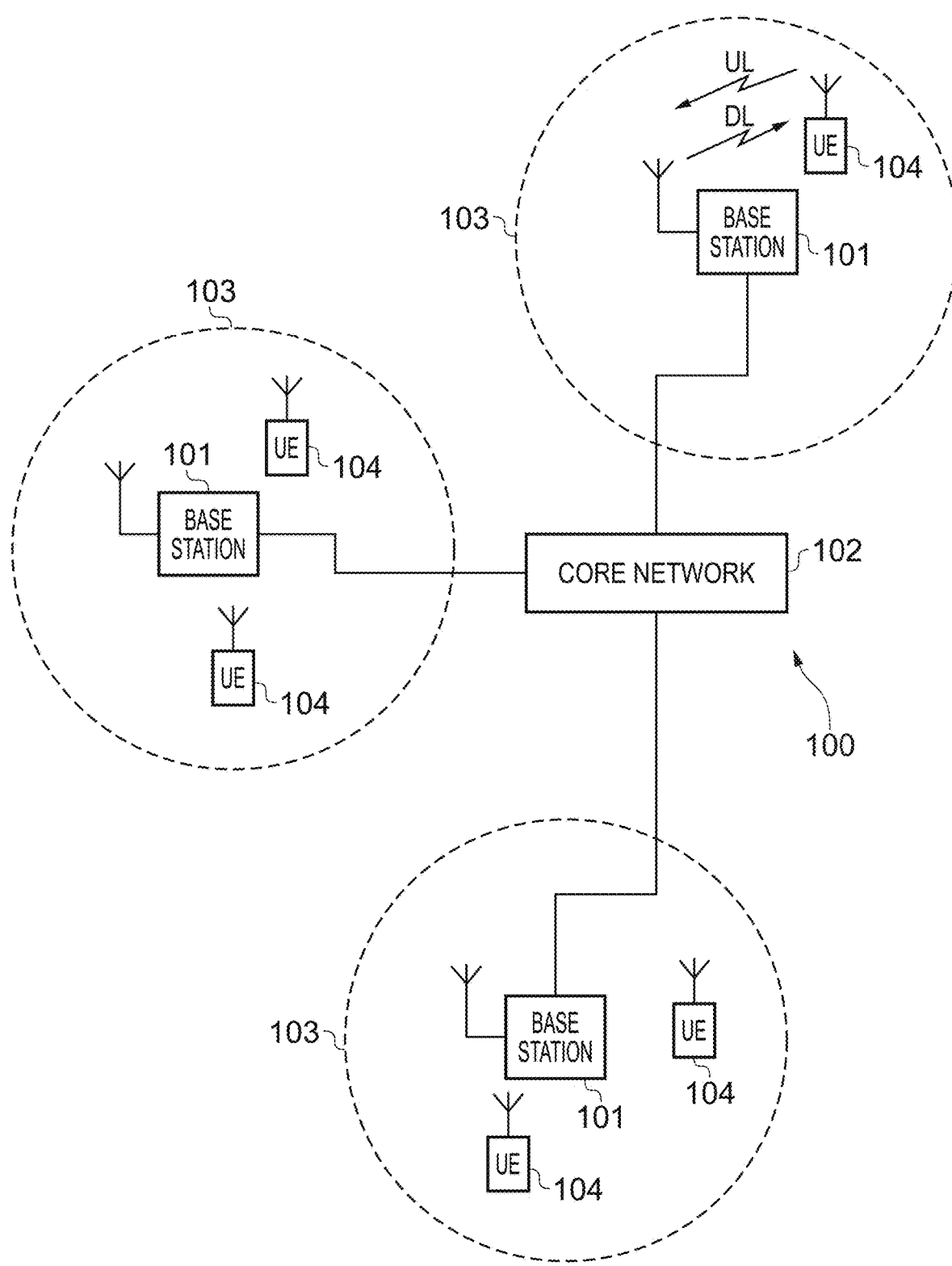
FIG. 1 schematically represents some aspects of a LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [5]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs, g-nodeBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

Figure 2:
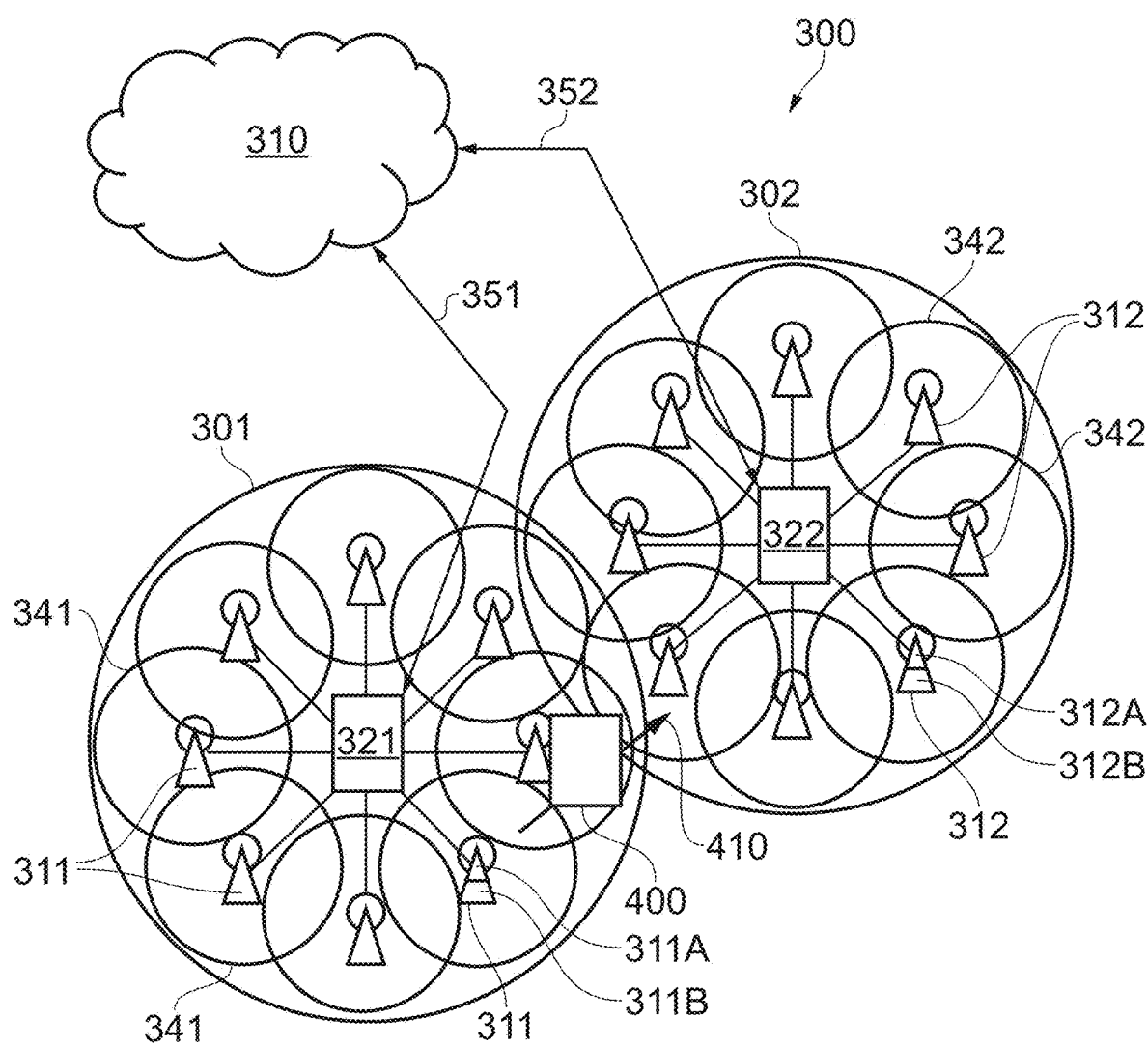
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless mobile telecommunications network/system 300 based on previously proposed approaches which may also be adapted to provide functionality in accordance with embodiments of the disclosure described herein. The new RAT network 300 represented in FIG. 2 comprises a first communication cell 301 and a second communication cell 302. Each communication cell 301, 302, comprises a controlling node (centralised unit) 321, 322 in communication with a core network component 310 over a respective wired or wireless link 351, 352. The respective controlling nodes 321, 322 are also each in communication with a plurality of distributed units (radio access nodes/remote transmission and reception points (TRPs)) 311, 312 in their respective cells. Again, these communications may be over respective wired or wireless links. The distributed units 311, 312 are responsible for providing the radio access interface for terminal devices connected to the network. Each distributed unit 311, 312 has a coverage area (radio access footprint) 341, 342 which together define the coverage of the respective communication cells 301, 302. Each distributed unit 311, 312 includes transceiver circuitry 311a, 312a for transmission and reception of wireless signals and processor circuitry 311a, 311b configured to control the respective distributed units 311, 312.

In terms of broad top-level functionality, the core network component 310 of the new RAT telecommunications system represented in FIG. 2 may be broadly considered to correspond with the core network 102 represented in FIG. 1, and the respective controlling nodes 321, 322 and their associated distributed units/TRPs 311, 312 may be broadly considered to provide functionality corresponding to base stations of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 400 is represented in FIG. 2 within the coverage area of the first communication cell 301. This terminal device 400 may thus exchange signalling with the first controlling node 321 in the first communication cell via one of the distributed units 311 associated with the first communication cell 301. In some cases communications for a given terminal device are routed through only one of the distributed units, but it will be appreciated in some other implementations communications associated with a given terminal device may be routed through more than one distributed unit, for example in a soft handover scenario and other scenarios. The particular distributed unit(s) through which a terminal device is currently connected through to the associated controlling node may be referred to as active distributed units for the terminal device. Thus the active subset of distributed units for a terminal device may comprise one or more than one distributed unit (TRP). The controlling node 321 is responsible for determining which of the distributed units 311 spanning the first communication cell 301 is responsible for radio communications with the terminal device 400 at any given time (i.e. which of the distributed units are currently active distributed units for the terminal device). Typically this will be based on measurements of radio channel conditions between the terminal device 400 and respective ones of the distributed units 311. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 400. That is to say, in some cases the terminal device may not be aware of which distributed unit is responsible for routing communications between the terminal device 400 and the controlling node 321 of the communication cell 301 in which the terminal device is currently operating. In such cases, as far as the terminal device is concerned, it simply transmits uplink data to the controlling node 321 and receives downlink data from the controlling node 321 and the terminal device has no awareness of the involvement of the distributed units 311. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units In the example of FIG. 2, two communication cells 301, 302 and one terminal device 400 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment may comprise a control unit/controlling node 321, 322 and/or a TRP 311, 312 of the kind shown in FIG. 2 which is adapted to provide functionality in accordance with the principles described herein.

As is well understood, various wireless telecommunications networks, such as the LTE-based network represented in FIG. 1 and the NR-based network represented in FIG. 2, may support different Radio Resource Control (RRC) modes for terminal devices, typically including: (i) RRC idle mode (RRC_IDLE); and (ii) RRC connected mode (RRC_CONNECTED). When a terminal device transmits data, RRC connected mode is generally used. The RRC idle mode, on the other hand, is for terminal devices which are registered to the network (EMM-REGISTERED), but not currently in active communication (ECM-IDLE). Thus, generally speaking, in RRC connected mode a terminal device is connected to a radio network access node (e.g. an LTE base station) in the sense of being able to exchange user plane data with the radio network access node. Conversely, in RRC idle mode a terminal device is not connected to a radio network access node in the sense of not being able to communicate user plane data using the radio network access node. In idle mode the terminal device may still receive some communications from base stations, for example reference signalling for cell reselection purposes and other broadcast signalling. The RRC connection setup procedure of going from RRC idle mode to RRC connected mode may be referred to as connecting to a cell/base station. In addition to these idle and connected modes there are also proposals for other RRC modes, such as the so-called RRC_INACTIVE mode. A terminal device in RRC_INACTIVE mode is one which is not in an active RRC connected mode with the radio access network (RAN), but is considered to be RRC Connected from a CN (core network) point of view, so that data can be sent without CN-level paging, but with paging performed instead at the RAN level, to cause/trigger the terminal device to resume RRC connection (enter an RRC connected mode). This approach has the benefit of being able to allow a terminal device to enter a more power efficient state, while reducing the signalling between the CN and the RAN. The overall procedure allows RAN to take over responsibility for paging the terminal device, effectively hiding the RRC state transitions and mobility from the CN, and the CN therefore may directly send data as if the terminal device was still connected and in the same cell.

For a terminal device in RRC idle mode the core network is aware that the terminal device is present within the network, but the RAN part (comprising radio network infrastructure equipment such as the base stations 101 of FIG. 1 and/or the combined TRPs/CUs of FIG. 2) is not. The core network is aware of the location of idle mode terminal devices at a paging tracking area level but not at the level of individual transceiver entities. The core network will generally assume a terminal device is located within the tracking area(s) associated with a transceiver entity most recently used for communicating with the terminal device, unless the terminal device has since provided a specific tracking area update (TAU) to the network. (As is conventional, idle mode terminal devices are typically required to send a TAU when they detect they have entered a different tracking area to allow the core network to keep track of their location.) Because the core network tracks terminal devices at a tracking area level, it is generally not possible for the network infrastructure to know which specific transceiver entities (radio network node) to use when seeking to initiate contact with a terminal device in idle mode. Consequently when a core network is required to connect to an idle mode terminal device a paging procedure is used.

In a typical currently deployed network, terminal devices which are not connected to the network (i.e. not in RRC_CONNECTED mode) monitor for paging messages periodically. For terminal devices operating in a discontinuous reception (DRX) mode this occurs when they wake-up for their DRX awake time. Paging signals for a specific terminal device are transmitted in defined frames (Paging Frames)/sub-frames (Paging Occasions) which for a given terminal device may be derived from the International Mobile Subscriber Identifier (IMSI) of the terminal device, as well as paging related DRX parameters established in system information transmitted within the network.

In a conventional system, a terminal device thus receives and checks the contents of specific sub-frames (paging occasions) in specific frames (paging frames) to look for paging signalling. For example, in accordance with the procedures set out in 3GPP TS 36.304 version 14.2.0 Release 14 [6], a Paging Frame (PF) is a downlink radio frame which may contain one or more Paging Occasion(s)

(PO), where a Paging Occasion is a sub-frame where there may be P-RNTI transmitted on PDCCH (or equivalent depending channel on implementation, e.g. MPDCCH or for NB-IoT on NPDCCH) addressing the paging message. Paging messages are conveyed on a physical downlink shared channel (PDSCH) on resources identified from an allocation message addressed to a paging radio network temporary identifier (P-RNTI) and conveyed on a physical downlink control channel (PDCCH). P-RNTI is a common identifier for all terminal devices (e.g. set at FFFE in hexa-decimal for the standard defined by 3GPP TS 36.321 version 13.5.0 Release 13 [7]). All terminal devices check whether PDCCH at specific PFs/POs configured for their use include P-RNTI or not. If there is a PDSCH allocation addressed to P-RNTI in the relevant subframe, the terminal device proceeds to seek to receive and decode the paging messages transmitted on the allocated resources on PDSCH. The terminal device then checks the list of IDs contained in the paging record list in the received paging message, to determine whether the list contains an ID corresponding to itself (for example P-TMSI or IMSI), and if so initiates a paging response.

Although the above description has summarised an example existing LTE paging procedure, it is expected that broadly similar principles may be adopted for future wireless telecommunications networks based on newer radio access technologies (RATs), such as 5G networks. The above-description of a paging procedure has referred to specific channel names which are commonly used in LTE, such as PDCCH and PDSCH, and this terminology will be used throughout this description for convenience, it being appreciated that in certain implementations different channel names may be more common. For example in the context of a wireless telecommunications system having dedicated channels for communicating with certain types of terminal device, for example MTC devices, it may be expected the corresponding channel names may be modified. For example, a physical downlink control channel dedicated for MTC devices may be referred to as MPDCCH and a corresponding physical downlink shared channel for MTC devices may be referred to as MPDSCH.

In proposed approaches for eNB-IoT and feMTC in accordance with 3GPP release 14 a terminal device in DRX in idle mode decodes PDCCH (or equivalent downlink control channel for the specific implementation at hand) to identify if there are resources scheduled on PDSCH (or equivalent downlink shared channel for the specific implementation at hand) for a paging message during paging occasions in which the terminal device might receive a paging message.

Figure 3:
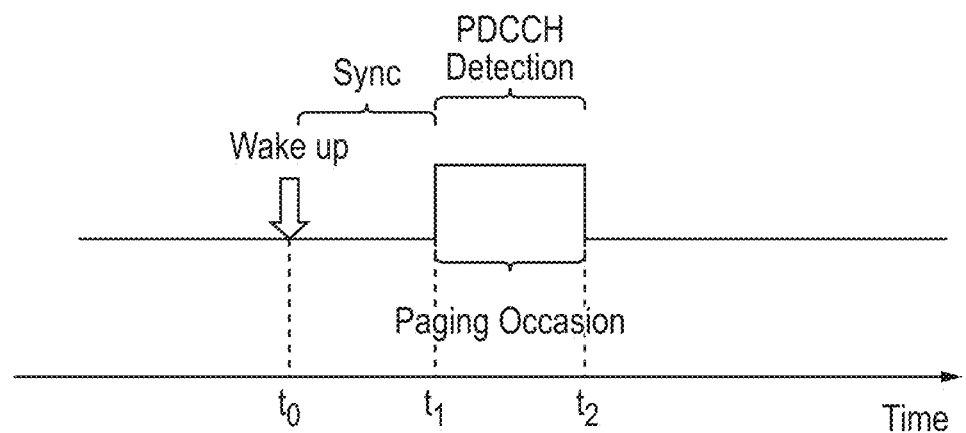
FIGS. 3 and 4 schematically represent example time lines associated with paging occasions in wireless telecommunication systems.

FIG. 3 schematically represents a timeline of a paging occasion for a terminal device operating in a wireless telecommunications system. In the example shown in FIG. 3, one paging occasion is shown and extends from time t1 to t2. Paging occasions for a terminal device will typically occur according to a regular repeating schedule having regard to the terminal device's currently configured DRX cycle. Different terminal devices may have different DRX cycle lengths, and so have different times between paging occasions. For a terminal device having a relatively long DRX cycle/time between paging occasions, it is possible the terminal device will to some extent lose synchronisation with the radio network infrastructure equipment of the telecommunications system between paging occasions. Thus it may be helpful for a terminal devices to wake-up in advance of a paging occasion to allow it to synchronise to the wireless telecommunications system prior to the paging occasion. An example of this is schematically shown in FIG. 3 in which the terminal device wakes up at time t0 so that it can synchronise with the wireless telecommunication system in the period between times t0 and t1 so that it is able to monitor/detect PDCCH during the configured paging occasion between t1 and t2. In this regard, the process of synchronisation might in some cases only require fine adjustments to frequency and/or timing tracking loops based on detection of CRS (cell-specific reference symbols), e.g. when DRX cycles (times between paging occasions) are relatively short, or a more significant degree synchronisation may be needed, for example complete re-synchronisation by detecting PSS/SSS (primary synchronisation signals/secondary synchronisation signals) as well as using CRS, e.g. when DRX cycles (times between paging occasions) are relatively long (such that the frequency and timing of the terminal device may become significantly offset relative to that of the radio network infrastructure).

Once the terminal device has re-synchronised to the network, it will monitor PDCCH to determine if there is a paging message, and if so will go on to decode the PDSCH carrying the paging message in the usual way. If there is no paging message for the terminal device, the terminal device will go back to sleep (low power mode) until the next paging occasion. For certain types of terminal device, such as MTC devices, it may be expected paging will occur relatively rarely (e.g. once per day for a smart utility meter), and so in many cases the terminal device may wake-up and synchronise to the network to monitor PDCCH by blind decoding for a paging message when in fact there is no paging message for the terminal device. This represents an undesirable "waste" of resources, for example battery power, for the terminal device.

Proposed approaches for eNB-IoT and feMTC in accordance with 3GPP release 15 share several common objectives, and one of these objectives is to reduce power consumption associated with monitoring for paging massages. One proposal for this is to introduce what is referred to as a wake-up signal (WUS) (e.g. of the type described in C. Hambeck, et al., "A 2.4 µW Wake-up Receiver for wireless sensor nodes with −71 dBm sensitivity", in IEEE Proceeding International Symposium of Circuits and Systems (ISCAS), 2011, pp. 534-537 [8]). The proposed WUS is carried on a new physical channel and is intended to allow terminal devices to determine whether or not they need to actually decode PDCCH in an upcoming paging occasion. That is to say, whereas in accordance with previously proposed techniques a terminal device decodes PDCCH during every paging occasion to determine if there is a paging message, and if so decodes PDSCH to determine if the paging message is addressed to the terminal device, the WUS is instead intended to indicate to the terminal device whether or not the next paging occasion contains a paging message that the terminal device should decode. A WUS is transmitted at a pre-determined/derivable time in advance of a scheduled paging occasion such that a terminal device knows when to seek to receive a WUS and may contain relatively little information so that it can be decoded quickly (as compared to the blind decoding needed for PDCCH). For example, in some implementations the WUS may include a one-bit indication of whether or not there will be a paging message transmitted in the upcoming paging occasion. In some implementations the indication provided by the WUS may be based on whether or not the WUS signalling is present.

If the WUS indicates the upcoming paging occasion does include a paging message, any terminal devices for which that paging occasion applies may proceed to decode the paging message as normal to determine if the paging message is addressed to it. If the WUS indicates the upcoming paging occasion does not include any paging message, any terminal device for which that paging occasion applies can determine from this that it does not need to monitor for a paging message during the upcoming paging occasion, and so can, for example, return to a low power mode. In some implementations the WUS may include an identifier for a terminal device that is going to be paged in the paging occasion. This identifier may identify an individual terminal device or may identify a group of terminal devices. The WUS may include multiple identifiers for multiple terminal devices/groups. A terminal device which determines the WUS is associated with an identifier that applies to it may proceed to decode the paging message as normal. Conversely, a terminal device which determines the WUS is not associated with an identifier that applies to it may determine from this that it does not need to monitor for a paging message during the upcoming paging occasion and can, for example, return to a low power mode. The WUS may also be encoded with a format that enables low power decoding (e.g. the WUS may be a narrow bandwidth signal that can be decoded with low power using a low sampling rate receiver), and furthermore may be transmitted with a format that allows reliable decoding even with relatively poor synchronisation.

Figure 4:
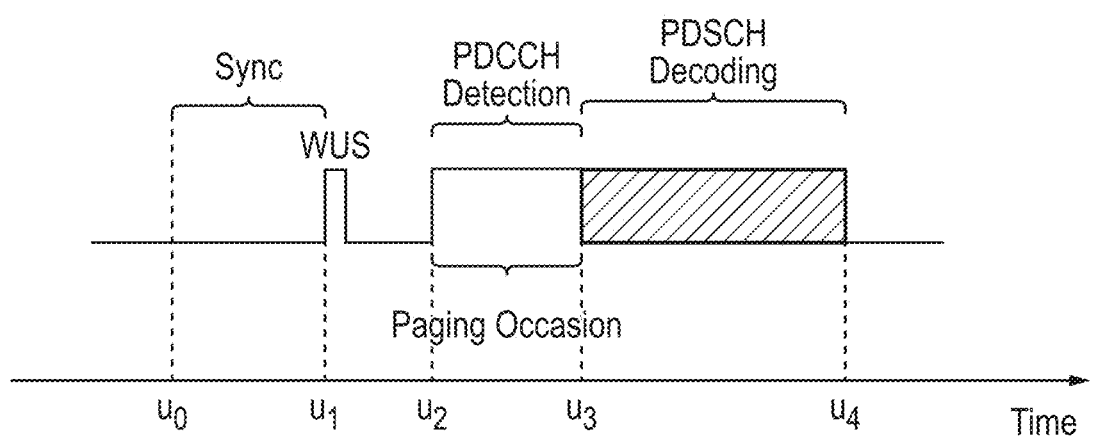

FIG. 4 schematically represents a timeline for a paging occasion for a terminal device operating in a wireless telecommunications system employing a WUS as proposed in association with 3GPP Release 15. In the example shown in FIG. 4, a paging occasion extends from time u2 to u3. As is conventional, the paging occasions will typically occur according to a regular repeating schedule having regard to the terminal device's currently configured DRX cycle.

As schematically indicated in FIG. 4, a WUS is transmitted at a predetermined/derivable time u1 in advance of the paging occasion to indicate there is a PDCCH paging message transmission for a terminal device indicated by an identifier associated with the WUS, which may identify an individual terminal device or a group of terminal devices. If the paging occasion is not scheduled to include a PDCCH paging message transmission for a terminal device, then a WUS identifying that terminal device is not sent. Thus a terminal device may be configured to seek to detect a WUS associated with an identifier for the terminal device in advance of an upcoming paging occasion. If the terminal device detects a WUS associated with an identifier for itself, the terminal device can proceed to fine tune its frequency and timing tracking loops if required and blind detects for a PDCCH between times u2 and u3, followed by decoding of the PDSCH carrying the paging message between time u3 and u4 in the usual way. If, however, the terminal device fails to detect a WUS associated with an identifier for the terminal device, the terminal device may assume there is not going to be a paging message for the terminal device in the upcoming paging occasion, and so may go back to sleep (low power mode) and not decode PDCCH in the paging occasion. As noted above, in some other implementations, the WUS might not include any indication of any specific terminal device(s)/group(s), but may instead simply include an indication of whether or not an upcoming paging occasion includes any paging message, i.e. the WUS may in effect be considered to apply to all terminal devices associated with the relevant paging occasion (this will in effect restrict power savings to paging occasions where no terminal devices are to be paged). Either way, by using WUS, a terminal device may be expected to consume less energy as it can help avoid unnecessary monitoring/blind decoding of PDCCH (or equivalent depending on the specific implementation at hand). It will be appreciated that WUS can also be used in RRC_INACTIVE mode RRC_CONNECTED mode when DRX is used.

If a terminal device is configured for a long DRX cycle (i.e. a relatively long time between paging occasions), it is possible a terminal device will lose synchronisation with the radio access network to an extent it is unable to decode WUS without first resynchronising to the radio access network. An example of this approach is schematically shown in FIG. 4 whereby a terminal device configured for a relatively long DRX cycle may be configured to wake-up at time u0 to allow time for it to synchronise to the radio access network before u1 so that it can detect any WUS signalling.

Figure 5:
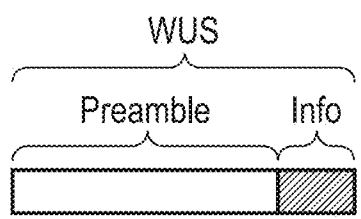
FIG. 5 schematically represents an example format for wake-up signalling (WUS) that may be used in certain embodiments of the disclosure.

FIG. 5 schematically represents an example format for wake-up signals (WUS) that include a signature sequence (preamble) and an information part (info). The preamble part comprises signalling for terminal devices to identify the signalling as a WUS and also, in some implementations, to use to achieve synchronisation with the network (i.e. with the radio network infrastructure equipment transmitting the WUS). The information part comprises an indication of one or more terminal devices to which the WUS applies, e.g. a terminal device identifier and/or an identifier for a group of terminal devices. The terminal device/group identifier(s) may be network allocated identifiers (e.g. radio network temporary identifiers, RNTI) for the terminal device(s), or any other form of suitable identifier, e.g. based on an IMSI for a terminal device. It will be appreciated the format for the wake-up signalling may not conform to that shown in FIG. 5, but may in other implementations have a different format. For example, the wake-up signalling may have a format in which the wake-up signalling comprises a preamble (signature sequence) without a separate information part. Instead, the preamble may itself contain an indication of the identity for the terminal device(s) for which the wake-up signalling indicates a paging message is to be subsequently transmitted, for example with specific WUS preambles (sequences/patterns) configured for specific terminal devices/groups of terminal devices.

Figure 6:
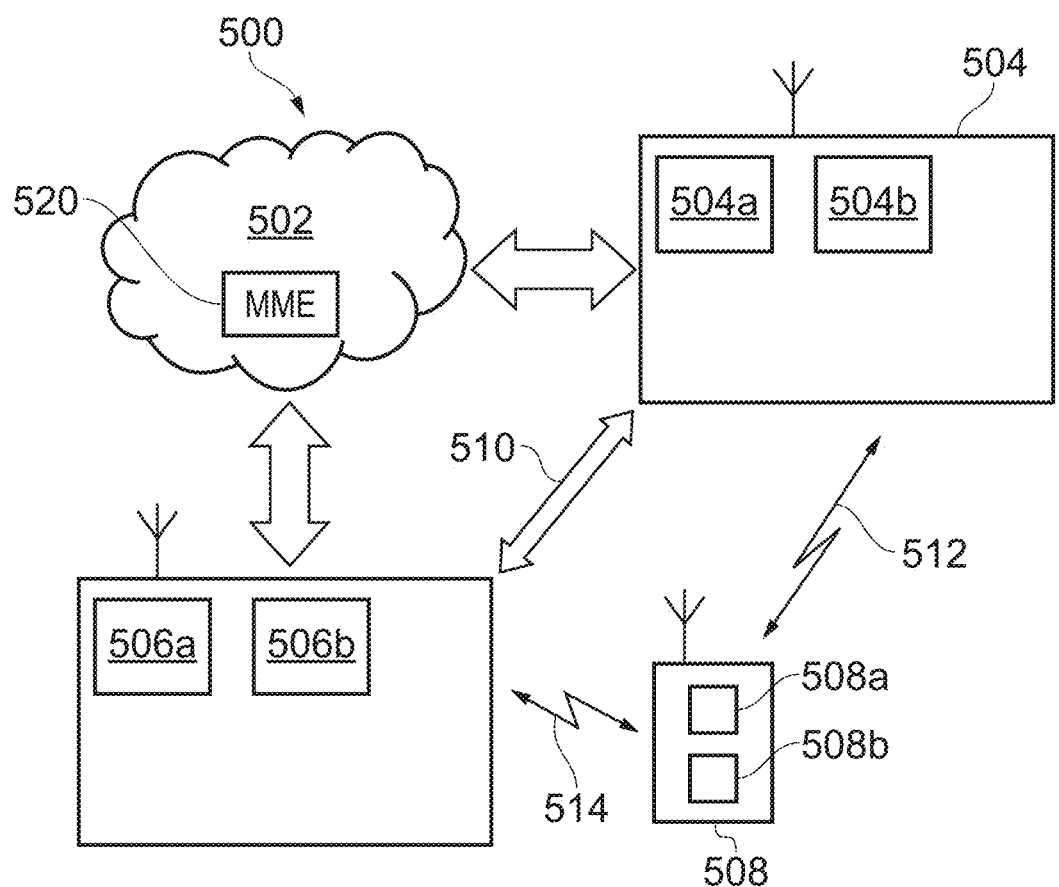
FIG. 6 schematically represents some aspects of a wireless telecommunication system in accordance with certain embodiments of the present disclosure.

FIG. 6 schematically shows some aspects of a telecommunications system 500 configured to support communications between a terminal device 508 and network access nodes 504, 506 in accordance with certain embodiments of the disclosure. Many aspects of the operation of the telecommunications system/network 500 are known and understood and are not described here in detail in the interest of brevity. Aspects of the architecture and operation of the telecommunications system 500 which are not specifically described herein may be implemented in accordance with any previously proposed techniques, for example according to current 3GPP standards and other proposals for operating wireless telecommunications systems/networks. The network access nodes 504, 506 may, for convenience, sometimes be referred to herein as base stations 504, 506, it being understood this term is used for simplicity and is not intended to imply any network access node should conform to any specific network architecture, but on the contrary, may correspond with any network infrastructure equipment/network access node that may be configured to provide functionality as described herein. In that sense it will appreciated the specific network architecture in which embodiments of the disclosure may be implemented is not of primary significance to the principles described herein.

The telecommunications system 500 comprises a core network part (evolved packet core) 502 coupled to a radio network part. The radio network part comprises the radio network access nodes 504, 506 and the terminal device 508. It will of course be appreciated that in practice the radio network part may comprise a more than two network access nodes serving multiple terminal devices across various communication cells. However, only a two network access nodes and one terminal device are shown in FIG. 6 in the interests of simplicity.

As with a conventional mobile radio network, the terminal device 508 is arranged to communicate data to and from the network access nodes (base stations/transceiver stations) 504, 506. Typically the terminal device will be operable to connect to (i.e. be able to exchange user plane data with) one network infrastructure element at a time, and so as the terminal device moves around the network it may move in and out of coverage of the different network access nodes comprising the network. The network access nodes 504, 506, are communicatively connected to a serving gateway, S-GW, (not shown) in the core network part which is arranged to perform routing and management of mobile communications services to the terminal devices in the telecommunications system 500 via the network access nodes 504, 506. In order to maintain mobility management and connectivity, the core network part 502 also includes a mobility management entity, MME, 520 which manages the enhanced packet service, EPS, connections with terminal devices operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 502 to an external packet data network, for example the Internet. As noted above, the operation of the various elements of the communications system 500 shown in FIG. 6 may be in accordance with known techniques apart from where modified to provide functionality in accordance with embodiments of the present disclosure as discussed herein.

The terminal device 508 is adapted to support operations in accordance with embodiments of the present disclosure when communicating with the network access nodes 504, 506. In this example the terminal device 508 is assumed to be an MTC terminal device. The terminal device 508 may be a dedicated MTC terminal device, such as a wearable technology item, or may be a generic terminal device, such as a smartphone terminal device, running an application that relies on MTC data exchange. Nonetheless, it will be appreciated the principles disclosed herein may also be applied for other types of terminal device (i.e. devices which may not be considered MTC devices). The terminal device 508 comprises transceiver circuitry 508a (which may also be referred to as a transceiver/transceiver unit) for transmission and reception of wireless signals and processor circuitry 508b (which may also be referred to as a processor/processor unit) configured to control the terminal device 508. The processor circuitry 508b may comprise various sub-units/sub-circuits for providing desired functionality as explained further herein. These sub-units may be implemented as discrete hardware elements or as appropriately configured functions of the processor circuitry. Thus the processor circuitry 508b may comprise circuitry which is suitably configured/programmed to provide the desired functionality described herein using conventional programming/configuration techniques for equipment in wireless telecommunications systems. The transceiver circuitry 508a and the processor circuitry 508b are schematically shown in FIG. 6 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the terminal device 508 will in general comprise various other elements associated with its operating functionality, for example a power source, user interface, and so forth, but these are not shown in FIG. 6 in the interests of simplicity.

The network access nodes 504, 506 each comprises transceiver circuitry 504a, 506a (which may also be referred to as a transceiver/transceiver unit) for transmission and reception of wireless signals and processor circuitry 504b, 506b (which may also be referred to as a processor/processor unit) configured to control the respective network access nodes 504, 506 to operate in accordance with embodiments of the present disclosure as described herein. Thus, the processor circuitry 504b, 506b for each network access node 504, 506 may comprise circuitry which is suitably configured/programmed to provide the desired functionality described herein using conventional programming/configuration techniques for equipment in wireless telecommunications systems. For each network access nodes 504, 506 the transceiver circuitry 504a, 506a and the processor circuitry 504b, 506b are schematically shown in FIG. 6 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated that each of the network access nodes 504, 506 will in general comprise various other elements associated with its operating functionality, such as a scheduler. For example, although not shown in FIG. 6 for simplicity, the processor circuitry 504b may comprise scheduling circuitry, that is to say the processor circuitry 504b may be configured/programmed to provide the scheduling function for the network access node.

The network access nodes 504, 506 are operable to communicate with the terminal device 508 (when in coverage) over respective radio communication links 512, 514. The network access nodes 504, 506 are operable to communicate with each other to share information through a communications link 210 between them. In some network architectures the network nodes may communicate directly with one another, as schematically represented in FIG. 6, while in other network architectures they may communicate with one another indirectly, e.g. via the core network part 502.

As noted above, a WUS comprises a predefined signature sequence/preamble which a terminal device is able to readily detect, e.g., when in a power saving mode (PSM). The specific signature sequence/preamble used in a given implementation may be referred to as a WUS sequence/preamble/pattern, or more generally as a WUS format, for the WUS signalling. A wireless network communications system may be configured so that different radio access nodes are associated with different WUS formats, for example to help avoid neighbouring cell interference. More generally, different radio access nodes may be associated with different WUS configurations, for example also having different periodicities and relative offsets in terms of the timings of WUS signals and associated paging occasions as well as different WUS signalling formats (WUS patterns). Thus, a network access node to which a terminal device is attached may provide the terminal device with cell-specific WUS configuration information so that when the terminal device enters the power saving mode, it has the information necessary to allow it to seek to detect WUS signalling from the network access node. The inventors have recognised a potential issue with this can arise for terminal devices which have a degree of mobility within the telecommunications system such that they may move out of the coverage area associated with a first network access node to the coverage area associated with a second network access node while in the power saving mode. This may occur because the terminal device is physically mobile, or because the terminal device is physically stationary, but nonetheless moves between cells due to changing cell conditions (e.g. so-called ping-ponging at a cell edge). It is expected a terminal device will not make measurements in the power saving mode (beyond seeking to detect WUS signalling), and so the terminal device will not be aware it has moved from the coverage of the first network access node to the coverage of the second network access node. Consequently, the terminal device will continue to seek WUS signalling in accordance with the configuration information settings received from the first network access node. This means the terminal device becomes uncontactable because it cannot receive WUS signalling from the first network access node because of coverage issues, and it cannot receive WUS signalling from the second network access node because it does not have the appropriate WUS configuration (i.e. it is searching for the wrong WUS format, potentially also at the wrong times). One way to overcome this problem would be to only use WUS procedures for static/relatively immobile terminal devices. However, the inventors have recognised there can still be useful power savings available to terminal devices that are mobile (subject to changing cell coverage) if they could also make use of WUS procedures.

Thus, certain embodiments of the disclosure provide for configuring a terminal device in a wireless telecommunications system with multiple WUS configurations at the same time, e.g. a different WUS configuration for at least some of the plurality of network access nodes. Thus the terminal device may establish first wake-up signalling configuration information comprising an indication of a first wake-up signalling format for a first network access node and second wake-up signalling configuration information comprising an indication of a second wake-up signalling format for a second network access node. This may be stablished, for example, from information received from the first network access node, e.g. in SIB (system information broadcast) signalling or RRC (radio resource control) signalling. Having established this information the terminal device is thus able to monitor for cell specific WUS signalling transmitted by either one of the first and second network access nodes and respond accordingly (e.g. seek to decode a subsequent paging message associated with the WUS signalling). Thus, if the terminal device is initially configured for WUS operation when attached to the first network access node, but subsequently moves from the coverage area of the first network access node to the coverage area of the second different network access node, the terminal device can still detect and react to WUS signalling. In terms of detecting and reacting to WUS signalling, it will be appreciated certain embodiments of the disclosure represent a development of previously proposed WUS schemes, and aspects and features of approaches in accordance with embodiments of the disclosure which correspond with aspects and features of existing WUS proposals, for example in terms of determining when WUS signalling is transmitted, specific WUS formats to use, WUS signalling detection techniques and so on, may be based on existing proposals.

Thus in accordance with some embodiments of the disclosure a terminal device in a wireless telecommunications system that uses cell-specific WUS signalling may still be paged using WUS even if it moves from the coverage of one cell to another. It will be appreciated the terminal device may establish WUS configuration information for more than two network access nodes so that it can be paged using WUS in more than two cells. In principle a terminal device could establish WUS configuration information for every network access node operating in the network so that it is contactable by WUS wherever it is located within the network. However, in practice, this may not be considered an optimum approach because of the large amount of decoding attempts and time that might be needed for the terminal device to detect WUS signalling. Consequently, the terminal device may be configured with WUS configuration information for only a restricted number of radio network access nodes, for example for two neighbouring radio access nodes if the terminal device is physically stationary in the vicinity of a boundary between the two neighbouring radio access nodes, but prone to ping-ponging between them (moving between coverage areas due to changing radio conditions). More generally, a compromise may be made between the ability to page the terminal device using WUS over a larger area and the amount of complexity involved in managing and seeking to decode multiple WUS configurations. For example a terminal device may be configured with WUS settings for the network access nodes in a tracking area containing the network access node to which it was attached when it established the multiple WUS configurations. In situations in which a terminal device moves to a location covered by a radio access node for which it does not have a WUS configuration, a separate recovery mechanism may be used. For example, a terminal device may be configured to perform a cell selection/reselection procedure if it determines that it has not been paged for more than a threshold amount of time, i.e. what might be considered a validity period for the WUS configuration information for at least one of the radio access nodes.

Figure 7:
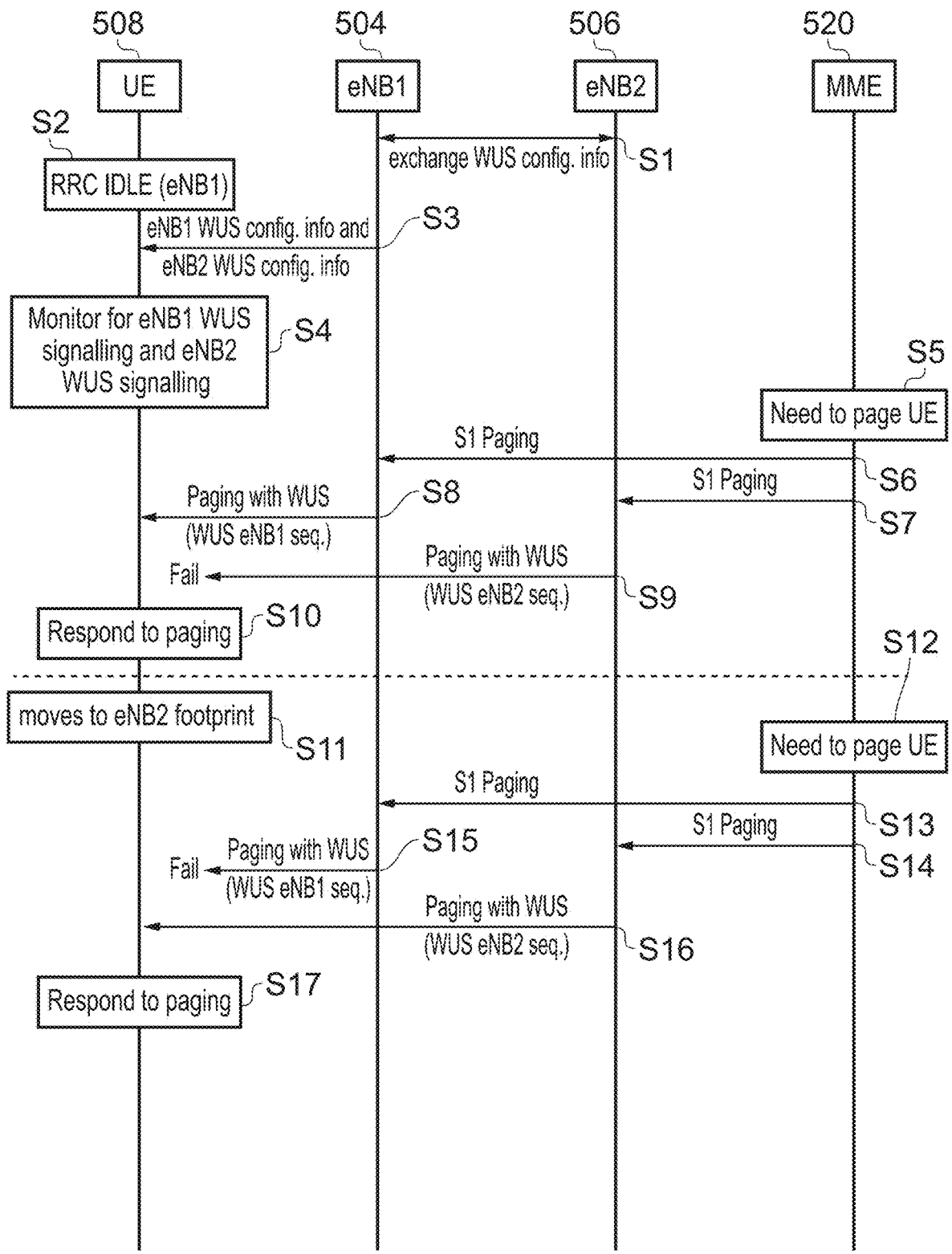
FIGS. 7 and 8 are a signalling ladder diagrams (message sequence charts) schematically representing some operating aspects of wireless telecommunications systems in accordance with certain embodiments of the disclosure.

FIG. 7 is a ladder diagram schematically representing some operating aspects of the wireless telecommunications system 500 discussed above with reference to FIG. 6 in accordance with certain embodiments of the disclosure. In particular, the diagram represents some operations and signalling exchange associated with the terminal device 508, the network access node 504, which for convenience may be referred to here as a first network access node 504 (eNB1), the network access node 506, which for convenience may be referred to here as a second network access node 506 (eNB2), and the MME 520 in the core network 502 in accordance with certain embodiments of the disclosure.

The processing of FIG. 7 starts in step S1 in which the first network access node and the second network access node exchange WUS configuration information such that the first network access node is made aware of the WUS configuration information for the second network access node, and the second network access node is made aware of the WUS configuration information for the first network access node. The WUS configuration information for the first network access node may be conveniently referred to as first WUS configuration information and the WUS configuration information for the second network access node may be conveniently referred to as second WUS configuration information. The WUS configuration information may be exchanged between the respective network access nodes using conventional techniques for exchanging information between network access nodes, e.g. across an X2 interface, for example during an X2 setup procedure if the WUS configuration information is relatively static.

As indicated in Step S2, for the scenario represented in FIG. 7 the terminal device 508 is initially in RRC_IDLE mode and configured for a discontinuous reception (DRX) mode of operation with the network access node 504 in a manner that uses wake-up signalling (i.e. providing the terminal device with an indication of whether an upcoming paging occasion will include a paging message that may be for the terminal device). This may be generally in accordance with previously proposed techniques, but modified in accordance with embodiments of the disclosure as discussed further herein.

As schematically indicated in step S3, the first network access node transmits WUS configuration information and this is received by the terminal device 508. The WUS configuration information comprises WUS configuration information for the first network access node and WUS configuration information for the second network access node (which the first network access node established from signalling received from the second network access node in step S1). In this example the WUS configuration information is transmitted in a system information broadcast, SIB, message transmitted by the first network access node. Thus, in step S2 the terminal device 508 establishes wake-up signalling (WUS) configuration information for both the first network access node 504 covering the current location for the terminal device 508 and the second network access node 506. In accordance with certain embodiments of the disclosure the wake-up signalling configuration information for each network access node comprises an indication of a respective WUS format (signature sequence) for paging the terminal device via the corresponding network access node.

As indicated in step S4, after receiving the first and second WUS configuration information in step S3, the terminal device 508 may enter a power saving mode in which it monitors for signalling transmitted by the first network access node that matches the first wake-up signalling format and for signalling transmitted by the first network access node that matches the first wake-up signalling format (either at the same time or in a time multiplexed manner as discussed further herein).

For the example implementation represented in FIG. 7, it is assumed steps S5 to S9 are performed while the terminal device remains in the coverage area of the first network access node.

In step S5 the MME determines a need to page the terminal device. The reason why the terminal device is to be paged is not significant to the principles described herein. For example, there may be data that needs to be transmitted to the terminal device, or there may be a desire to trigger the terminal device to transmit data to the network.

In steps S6 and S7 the MME 520 sends respective paging request messages to the first network access node 504 and the second network access node 506. These paging request messages may be conventional. In that regard it will be appreciated the overall paging strategy, for example in terms of which network access nodes are requested to page the terminal device, when they should do so, and how many attempts they should make, in any given scenario is not significant to the principles described herein.

In step S8 the first network access node 504 pages the terminal device 508 using the WUS procedure. That is to say the first network access node 504 transmits a WUS in accordance with the first WUS format and timings defined in the first WUS configuration information transmitted to the terminal device in step S3, and follows this with a paging message in the relevant paging occasion. This aspect of the processing of FIG. 7 may be performed in accordance with previously proposed techniques for paging using WUS.

As indicated in step S9 in this scenario it is assumed the paging strategy is such that the second network access node 506 also seeks to page the terminal device 508 using the WUS procedure in parallel with the first network access node in step S8. That is to say the second network access node 506 transmits a WUS in accordance with the second WUS format and timings defined in the second WUS configuration information transmitted to the terminal device in step S3, and follows this with a paging message in the relevant paging occasion. However, although the terminal device 508 has been provided with the relevant WUS configuration information to receive WUS signalling from the second network access node, the paging in step S9 fails because the terminal device is in this example scenario assumed to be not in coverage of the second network access node 506.

As schematically indicated in step S10, and in response to having successfully received the paging message transmitted using WUS by the first network access node in step S8, the terminal device responds to the paging message in the conventional way, and after any further signalling associated with the cause for the paging is completed, the terminal device may return to the power saving mode in which it continues to monitor for WUS signalling for any further paging events. When the terminal device returns to RRC_IDLE having entered RRC_CONNECTED mode in response to the paging message, the terminal device may, for example, continue to use the existing WUS configuration information from step S3, or use new/updated WUS configuration information. New/updated WUS configuration information may, for example, be received in an RRC message, e.g. an RRC connection release message when in RRC_CONNECTED mode in response to the paging message, or in a cell selection/reselection procedure after returning to RRC_IDLE mode.

Thus, the processing of steps S5 to S10 represents the successful completion of a paging event for the terminal device 508 using WUS via the first network access node 504, i.e., without the terminal device moving out of coverage of the network access node to which it most recently connected.

However, in the example processing represented in FIG. 7, it is assumed in step S11 the terminal device moves out of the coverage area of the first network access node 504 and into the coverage area of the second network access node 506. This may occur due to physical movement of the terminal device or due to changing radio conditions impacting the coverage areas of the respective network access nodes. Because the terminal device is operating in a power saving mode in which it does not make cell measurements, the terminal device does not know it has moved out of coverage of the first network access node and into coverage of the second network access node, and consequently nor does the MME or any other network infrastructure element know this.

In step S12 the MME determines a need to page the terminal device again. The reason why the terminal device is to be paged is again not significant to the principles described herein.

In the same way as discussed above for steps S6 and S7, in steps S13 and S14 the MME 520 sends respective paging request messages to the first network access node 504 and the second network access node 506. These paging request messages may again be conventional.

In step S15 the first network access node 504 attempts to page the terminal device 508 using the WUS procedure. That is to say the first network access node 504 transmits a WUS in accordance with the first WUS format and timings defined in the first WUS configuration information transmitted to the terminal device in step S3, and follows this with a paging message in the relevant paging occasion. However, this paging attempt by the first network access node in step S15 fails because the terminal device is in this example scenario assumed to be not in coverage of the first network access node 506 having moved to the coverage area of the second network access node in step S11.

As indicated in step S16, and as noted above, in this example implementation the paging strategy is such that the second network access node 506 also seeks to page the terminal device 508 using the WUS procedure in parallel with the first network access node's attempt in step S15. Thus in step S16 the second network access node 506 transmits a WUS in accordance with the second WUS format and timings defined in the second WUS configuration information transmitted to the terminal device in step S3, and follows this with a paging message in the relevant paging occasion. Because the terminal device 508 has been provided with the relevant WUS configuration information to receive WUS signalling from the second network access node (in step S3), and because it has moved into coverage of the second network access node (in step S11), the terminal device is able to successfully detect the WUS signalling from the second network access node and receive the associated paging message in the relevant paging occasion in step S16.

In step S17 the terminal device responds to the paging message received in step S16 in the conventional way, and after any further signalling associated with the cause for the paging is completed, the terminal device may returns to the power saving mode in which it continues to monitor for WUS signalling. As part of step S17 the terminal device may be configured to decode system information broadcast, SIB, signalling transmitted by the second network access node to facilitate the response to the paging message, for example in the even the terminal device needs to acquire cell-specific information associated with the second network access node to respond to the paging message using the second network access node. When the terminal device returns to RRC_IDLE having entered RRC_CONNECTED mode in response to the paging message, the terminal device may, for example, continue to use the existing WUS configuration information from step S3, or use new/updated WUS configuration information. New/updated WUS configuration information may, for example, be received from the second network access node in an RRC message, e.g. an RRC connection release message when in RRC_CONNECTED mode in response to the paging message, or in a cell selection/reselection procedure after returning to RRC_IDLE mode.

Thus, the processing of steps S12 to S17 represents the successful completion of a paging event for the terminal device using WUS, despite the terminal device having moved out of coverage of the network access node which configured it to receive WUS signalling.

Thus, the approach set out above of configuring a terminal device with multiple WUS configurations allows the terminal device to recover from a situation in which it would otherwise have become non-contactable.

It will be appreciated the processing represented in FIG. 7 sets out only some of the steps involved in the procedure, and for simplicity and ease of representation, some steps performed in accordance with this example implementation are not shown in FIG. 7 or amalgamated into fewer steps.

Furthermore, it will further be appreciated there are various modifications that may be made to the processes described herein in accordance with other example implementations.

For example, whereas the processing discussed above with reference to FIG. 7 concerns a terminal device in RRC_IDLE mode (as indicated in step S2), the same approach may be used for a terminal device starting in RRC_INACTIVE mode.

Furthermore, whereas the WUS configuration information from the first network access node is provided to the terminal device in a system information broadcast, SIB, message in step S3 in FIG. 7, the WUS configuration information may also be provided to the terminal device in other ways, for example through radio resource control, RRC, signalling at an earlier time when the terminal device was in RRC_CONNECTED mode.

Furthermore, whereas the example of FIG. 7 shows two network access nodes sharing aspects of their WUS configuration information, for example for a terminal device that frequently moves between them, the same approach may be used with more network access nodes sharing aspects of their WUS configuration information, for example for a terminal device that frequently moves between more than two network access nodes, or among a defined group of network access nodes, for example, those in a tracking area.

Figure 8:
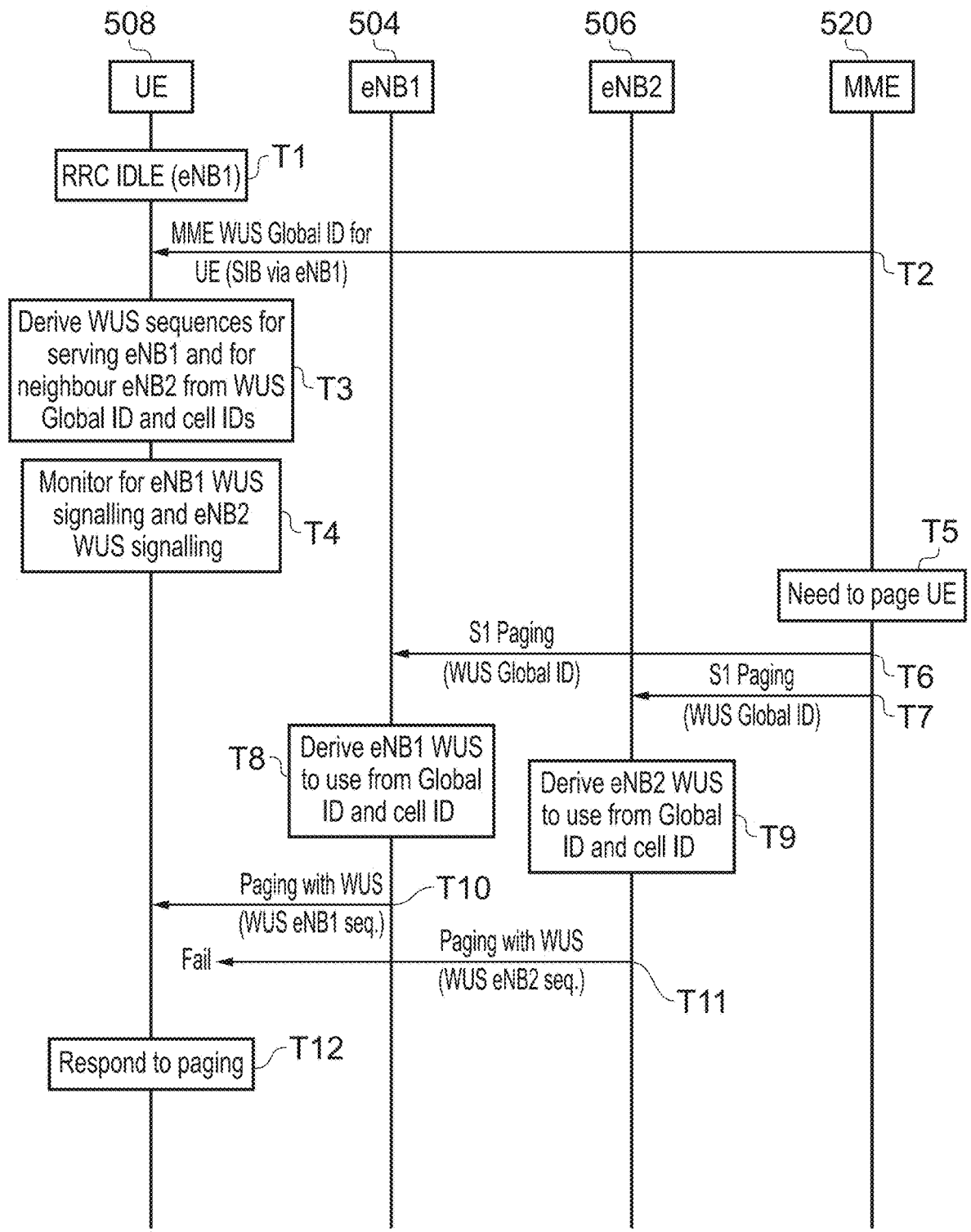

Whereas in the example of FIG. 7 the first and second network access nodes share WUS configuration information in step S1 so that the first network access node can provide the terminal device with the WUS configuration information for the second network access node in step S3, in other examples there are other ways in which the terminal device can obtain the relevant configuration information, for example as shown in FIG. 8.

FIG. 8 is a ladder diagram schematically representing some operating aspects of the wireless telecommunications system 500 as discussed above with reference to FIG. 6 in accordance with certain other embodiments of the disclosure. Various aspects of FIG. 8 are similar to, and will be understood from, corresponding aspects of FIG. 7. However, FIG. 8 represents a modified approach to that represented in FIG. 7 in which the terminal device establishes WUS configuration information for multiple network access nodes in a different way.

In accordance with the approach generally set out in FIG. 8 an MME may be configured to establish an identifier for each of different subsets of terminal devices registered with the MME and which may be paged using WUS in accordance with the principles described herein. The manner in which the terminal devices are divided into groups, the number of groups, and the number of terminal devices within each group, are not significant to the principles described herein. For example, the MME may simply define ten groups with terminal devices placed into groups according to the last digit of a terminal device unique identifier, for example an IMSI. However, in other approaches the terminal devices may be grouped having regard to other characteristics, for example so that terminal devices which may be expected to be paged at the same time, for example smart meters belonging to a particular utility company, are grouped together. Each group may thus be associated with what may be referred to as a WUS Global ID, which in practice may be a simple index/group number. In principle each group may comprise a single terminal device, but in practice the management of the scheme may be simplified by grouping multiple terminal devices together (e.g. to reduce the number of different WUS Global IDs and WUS signature sequences required).

The processing of FIG. 8 starts in step T1 with the terminal device 508 in RRC_IDLE and configured for a discontinuous reception (DRX) mode of operation with the network access node 504 in a manner that uses wake-up signalling. This may be generally in accordance with previously proposed techniques, but modified in accordance with embodiments of the disclosure as discussed further herein.

In step T2 the MME transmits signalling to the terminal device to indicate the WUS Global ID for the group the MME has allocated for the terminal device. In this example, with the terminal device in RRC_IDLE, this information is provided via the first network access node through SIB signalling, but the indication of the relevant WUS Global ID allocated by the MME to the terminal device may equally be transmitted in any of a number of different ways. For example the WUS Global ID information may also be provided to the terminal device through radio resource control, RRC, signalling from an earlier time when the terminal device was in RRC_CONNECTED mode.

In step T3 the terminal device derives cell-specific first and second WUS signalling formats for the first network access node (serving network access node) and the second network access node (neighbour network access node) respectively. The cell-specific WUS signalling formats (and other relevant WUS configuration information) may be derived from a predefined function having the WUS Global ID for the terminal device as one input and the cell ID for the relevant network access node as a second input, for example based on a predefined look-up table. The terminal device knows its WUS Global ID from the signalling received in step T2, and can determine the cell IDs for it serving cell and neighbouring cells in the usual way (e.g. from a Neighbour Cell List transmitted by the first network access node to which the terminal device is initially attached). Thus the terminal device can determine from this information, and the predefined mapping function/look-up table (e.g. predefined by standard), what WUS signalling format to receive from the various network access nodes.

As indicated in step T4, after deriving the first and second WUS configuration information in step T3, the terminal device 508 may enter a power saving mode in which it monitors for signalling transmitted by the first network access node that matches the first wake-up signalling format and for signalling transmitted by the first network access node that matches the first wake-up signalling format (either at the same time or in a time multiplexed manner as discussed further herein).

For the example implementation represented in FIG. 7, it is assumed steps T5 to T12 are performed while the terminal device remains in the coverage area of the first network access node.

In step T5 the MME determines a need to page the terminal device. The reason why the terminal device is to be paged is not significant to the principles described herein. For example, there may be data that needs to be transmitted to the terminal device, or there may be a desire to trigger the terminal device to transmit data to the network.

In steps T6 and T7 the MME 520 sends respective paging request messages to the first network access node 504 and the second network access node 506. These paging request messages may be based on conventional paging request messages, but in accordance with embodiments of the disclosure are modified to include an indicator of the WUS Global ID relevant for the terminal device that the MME wishes to page.

In steps T8 and T9 the respective network access nodes derive their own cell-specific WUS signalling formats using the same predefined mapping function/look-up table as the terminal device uses in step T3, which may be standardised in the network, or otherwise determined and shared among the relevant elements of the network, e.g., with coordination by the MME. The respective network access nodes know the relevant WUS Global ID to use from the paging request messages received in steps T6 and T7, and know their own cell IDs, so they can derive the relevant WUS signalling format they should each use. As already noted above, it will be appreciated the overall paging strategy, for example in terms of which network access nodes are requested to page the terminal device, when they should do so, and how many attempts they should make, in any given scenario is not significant to the principles described herein.

In step T10 the first network access node 504 pages the terminal device 508 using the WUS procedure. That is to say the first network access node 504 transmits a WUS in accordance with the first WUS format it derived in step T8, and follows this with a paging message in the relevant paging occasion. This aspect of the processing of FIG. 8 may be performed in accordance with previously proposed techniques for paging using WUS. That is to say, what is significant for this embodiment is the different manner in which the network access node derives the specific WUS signalling format to use from its own cell ID and the identification information received from the MME in association with the paging message, and not the specific manner in which the WUS signalling is transmitted.

As indicated in step T11 in this scenario it is assumed the paging strategy is such that the second network access node 506 also seeks to page the terminal device 508 using the WUS procedure in parallel with the first network access node. That is to say the second network access node 506 transmits a WUS in accordance with the second WUS format it derived in step T9, and follows this with a paging message in the relevant paging occasion. This aspect of the processing of FIG. 8 may again be performed in accordance with previously proposed techniques for paging using WUS.

As noted above, for the example scenario represented in FIG. 8, it is assumed the terminal device remains in coverage of the first network access node, and as such it detects the WUS signalling from the first network access node in step T10 and subsequent paging message. Thus, as indicated in FIG. 8, the attempt to page the terminal device in step T11 fails because the terminal device is not in coverage of the second network access node. However, it will be appreciated that if the terminal device has moved from the coverage area of the first network access node to the second network access node, while it would not receive the paging message in step T10, it would instead receive the paging message in step T11. That is to say, the terminal device would remain pageable using WUS regardless of whether it moves between cells because it supports multiple WUS configurations as discussed above.

As schematically indicated in step T12, and in response to having successfully received the paging message transmitted using WUS by the first network access node in step T10, the terminal device responds to the paging message in the conventional way, and after any further signalling associated with the cause for the paging is completed, the terminal device may return to the power saving mode in which it continues to monitor for WUS signalling for any further paging events.

Thus, to summarise some aspects of certain embodiments of the disclosure, a UE may be configured with multiple WUS configurations, for example configurations relating to a plurality of neighbouring cells. The WUS configuration for the neighbouring cells may, for example, include an indication of a WUS sequence, radio resources (in time and frequency) used for WUS signalling, WUS signalling location (e.g. an indication of a narrowband within a broader network frequency range and a periodicity for the WUS signalling), a WUS signalling repetition number (e.g. if different cells support different amounts of coverage extension), and potentially a WUS validity timer (i.e. a duration for which the associated WUS configuration is considered to remain valid, and after which the UE should seek new/updated WUS configuration information, for example by performing a cell selection/reselection procedure).

Thus, in addition to a serving cell's specific WUS settings, the UE can also be configured with one or more neighbour cells' WUS settings. As described herein, the network may not be aware when a UE has moved cells and hence providing the UE with the WUS configuration for a neighbouring cell can help enable the UE to detect the WUS used by a cell without the need to read the SIB of the cell and be reconfigured, which can in some cases consume a relatively large amount of battery power. This approach can thus help a UE to save power (by not reading the SIB in the new cell). In some implementations a UE may check (i.e. monitor for/seeks to detect) more than one WUS sequence before each paging occasion, and so it can in some cases be helpful to restrict the number of simultaneous WUS sequences the terminal device is configured to seek to blind decode for a given paging occasion to reduce UE complexity.

In some cases where there may be a particular desire to further reduce UE complexity, for example by adopting approaches in which the terminal device does not need to blind decode for multiple (or at least more than a threshold number of) WUS sequences/formats for at least some paging occasions. In one example this may be achieved by having multiple network access nodes adopt the same WUS configuration, so that the terminal device can be configured for, and attempt to blind decode, just a single WUS signalling format/sequence. In this case an MME entity may be configured to indicate the WUS signalling format a network access node should use in association with a paging request message sent to the network access node. In some examples this could be signalled explicitly, which would require some modification of the MME, which may not be desired from a network management perspective. Alternatively the indication of which WUS sequence to use for a paging message may be conveyed to the network access nodes implicitly. For example, it is known for an MME to include a "recommended cells for paging" information element in a paging request message sent to network access nodes indicating the most recently visited cells by the UE in order. The respective network access nodes may thus be configured to select a WUS format to use based on which network access node is listed as most recently visited/connected to, for example. The mapping between network access nodes and WUS formats may be statically defined in the network, or each network access node may select its own WUS format and share this among other radio access nodes that may need the information in a dynamic way, e.g. using X2 signalling, for example other network access nodes in its paging tracking area. In some examples the WUS signalling format may allow a network access node to convey a degree of additional information to the terminal device. For example, in addition to comprising a predefined WUS pattern, the WUS signalling format may allow for some additional data that may be selected by the network access node, for example in an appropriately configured preamble or an information part associated with a preamble. A network access node may use this to in effect provide the UE with an indication it has moved cell/network access node. That is to say, a neighbour cell may get information for the WUS configuration of a serving cell and transmit the serving cell WUS with an indication in the additional data of the WUS signalling to indicate the WUS signalling is not coming from the initial serving radio access node (e.g. this may be network access node identifier). The UE may be configured to react to this by performing cell reselection or otherwise reacquiring an updated WUS configuration from the new cell (i.e. the cell to which it has moved).

In another example to help reduce blind decoding requirements for a UE, the UE may be configured with at least two WUS configurations as discussed above, but may seek to blind decode in accordance with each of them for different paging occasions in a time multiplexed manner. That is to say, the UE may seek to decode fewer, e.g. in some cases only one, WUS sequences per paging occasion than the total number of WUS sequences for which it has been configured.

For example, the UE may use (i.e. seek to decode) a first WUS sequence associated with a first WUS configuration for a first period, e.g. comprising N1 consecutive paging occasions, and if it fails to detect the first WUS sequence in the first period (i.e. for N1 consecutive WUS occasions, wherein a WUS occasion is a time at which WUS could potentially be transmitted), it will then use the second WUS configuration for a second period, e.g. comprising N2 consecutive paging occasions, and if it fails to detect the second WUS sequence in the second period (i.e. for N2 consecutive WUS occasions), it may then use a third WUS sequence associated with a third WUS configuration (if it has one) for a third period, and so on. Thus the criterion for switching from one WUS configuration to the next may be based on the amount of time for which each WUS configuration is used without detecting WUS signalling (e.g. values for N1 and N2). For example, the first WUS sequence may be cell specific (e.g. relating to the cell which provided the UE with its configuration information), whilst a second WUS sequence may be a group cell-specific WUS sequence (e.g. common to a group of neighbour cells that share the same sequence or a TA area shares the same sequence). The UE can thus start using the first WUS sequence, and upon failing to detect WUS signalling for N1 consecutives WUS occasions, it may switch to use the second WUS sequence. The second WUS sequence may be associated with a larger periodicity (i.e. transmitted less often) than the first WUS sequence. Hence the UE would initially use a first WUS sequence in its serving cell and when it has moved cell (without the UE realising it) during a power saving mode, the UE will fail to detect the first WUS sequence, but since the second WUS sequence is transmitted by neighbouring cells, the UE will hence be able to detect it. The second WUS sequence may be always transmitted by the neighbouring cells or used only when the MME indicates it to the cells depending on the implementation at hand. When all WUS configurations available to the UE have been attempted and failed to detect any WUS, the UE may, for example, perform reselection and reacquire WUS configuration in the new cell.

As noted above, in some implementations the WUS configuration information may include a validity timer/period for each WUS sequence. In some examples a UE with multiple WUS configurations might initially use a first WUS configuration until its validity timer expires, after which it may use a second WUS configuration and so on. That is the termination criterion (which when met causes the UE to switch to the next WUS) may be the validity timer of each WUS, with the validity timer for one WUS sequence starting when the previous ones expires (i.e. with the timers running in sequence rather than parallel). The durations for the different validity timers can for example be configured based on the coverage of the network access node(s) using the corresponding WUS. For example, if a first WUS configuration is used within a single cell, e.g. the serving cell for the UE when it last performed cell selection, it may have a smaller validity timer (i.e. expires faster) and a second WUS configuration common to a group of cells that covers a larger area and therefore may be configured with a larger validity timer (on the basis it may take the UE longer to move out of coverage of radio access nodes using this WUS sequence). In some cases, when any, or a selected group, of the validity timers expire, the UE may perform cell reselection/connection to seek to obtain the latest WUS configurations. For example, if a UE is configured with four different WUS configurations, the UE might only perform cell reselection/connection to update its WUS configurations if the 2nd and 3rd WUS validity timers expire, for example.

While some of the above examples have focused on approaches in which a UE might only attempt to blind decode for one WUS sequence at a time (e.g. per paging occasion) to reduce computational effort and associated power usage and circuitry complexity, it will be appreciated other examples may reduce complexity by having the UE blind decode for fewer than its total number of WUS configurations per paging occasion, but more than one. For example, a UE with five WUS configurations may attempt to blind decode for two different WUS configurations at for each potential WUS occasion in a first time period, and after failing to decode WUS signalling in that period (e.g. after N1 attempts), the UE may switch to attempting to blind decode for the remaining three different WUS configurations at for each potential WUS occasion in a second time period (i.e. the number of WUS sequences to attempt to blind decode may be different in different time periods). It will be appreciated different criterion can be used to determine when to switch between seeking different WUS sequences. For example, a first group of one or more WUS sequences may be attempted for a given number of WUS occasions, after which a second group of one or more WUS sequences may be attempted until a validity timer (either defined for the group as a whole or individually for each configuration in the group) expires.

In some other examples WUS signalling may indicate another one or more WUS configuration to use. For example, a UE may be configured with three WUS configurations. A serving cell may use first WUS configuration, and when the UE moves to a new cell (without realising it), the UE will initially continue to attempt to detect for the first WUS. This may be transmitted by the new (neighbouring) cell (e.g. as requested by the MME or X2 signalling from the serving cell). In this case the first WUS signalling transmitted by the new cell may include an indication (e.g. using approach of including additional data as discussed above) for the UE to switch to using the second WUS configuration. The UE can then proceed with using the second WUS configuration. That is, in this embodiment, the WUS termination criterion is explicitly indicated in the WUS.

Thus there has been described a method of operating a terminal device in a wireless telecommunications system comprising the terminal device and a plurality of network access nodes, wherein the method comprises: establishing first wake-up signalling configuration information for a first network access node, wherein the first wake-up signalling configuration information comprises an indication of a first wake-up signalling format to be transmitted by the first network access node in advance of transmitting a paging message; establishing second wake-up signalling configuration information for a second network access node, wherein the second wake-up signalling configuration information comprises an indication of a second wake-up signalling format to be transmitted by the second network access node in advance of transmitting a paging message; and monitoring for signalling transmitted by the first network access node in accordance with the first wake-up signalling format and monitoring for signalling transmitted by the second network access node in accordance with the second wake-up signalling format, and seeking to decode a subsequent paging message in response to detecting wake-up signalling in accordance with either the first wake-up signalling format or the second wake-up signalling format.

There has also been described a method of operating a first network access node in a wireless telecommunications system comprising a terminal device and a plurality of network access nodes, wherein the method comprises: establishing first wake-up signalling configuration information for the first network access node, wherein the first wake-up signalling configuration information comprises an indication of a first wake-up signalling format to be transmitted by the first network access node in advance of transmitting a paging message; establishing second wake-up signalling configuration information for a second network access node, wherein the second wake-up signalling configuration information comprises an indication of a second wake-up signalling format to be transmitted by the second network access node in advance of transmitting a paging message; and transmitting to the terminal device an indication of the first and second wake-up signalling configuration information.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the terminal device. It will be appreciated such predetermined/predefined information may in general be established, for example, by definition in an operating standard for the wireless telecommunication system, or in previously exchanged signalling between the base station and terminal devices, for example in system information signalling, or in association with radio resource control setup signalling. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of operating a terminal device in a wireless telecommunications system comprising the terminal device and a plurality of network access nodes, wherein the method comprises: establishing first wake-up signalling configuration information for a first network access node, wherein the first wake-up signalling configuration information comprises an indication of a first wake-up signalling format to be transmitted by the first network access node in advance of transmitting a paging message; establishing second wake-up signalling configuration information for a second network access node, wherein the second wake-up signalling configuration information comprises an indication of a second wake-up signalling format to be transmitted by the second network access node in advance of transmitting a paging message; and monitoring for signalling transmitted by the first network access node in accordance with the first wake-up signalling format and monitoring for signalling transmitted by the second network access node in accordance with the second wake-up signalling format, and seeking to decode a subsequent paging message in response to detecting wake-up signalling in accordance with either the first wake-up signalling format or the second wake-up signalling format.

Paragraph 2. The method of paragraph 1, wherein the terminal device establishes the first and second wake-up signalling configuration information by receiving an indication of the first and second wake-up signalling configuration information from the first network access node.

Paragraph 3. The method of paragraph 2, wherein the indication of the first and second wake-up signalling configuration information is received from the first network access node in system information broadcast, SIB, signalling transmitted by the first network access node.

Paragraph 4. The method of paragraph 2, wherein the indication of the first and second wake-up signalling configuration information is received from the first network access node in radio resource control, RRC, signalling transmitted by the first network access node.

Paragraph 5. The method of any of paragraphs 1 to 4, wherein the terminal device establishes the first and second wake-up signalling configuration information in accordance using a predefined mapping between different combinations of an identifier for the terminal device and an identifier for the respective network access nodes and different wake-up signalling configuration information.

Paragraph 6. The method of any of paragraphs 1 to 5, wherein the terminal device establishes the first and second wake-up signalling configuration information when attached to the first network access node, and then in response to detecting wake-up signalling in accordance with the second wake-up signalling format seeks to decode system information broadcast, SIB, signalling transmitted by the second network access node.

Paragraph 7. The method of any of paragraphs 1 to 6, wherein the terminal device establishes the first and second wake-up signalling configuration information when attached to the first network access node, and then in response to detecting wake-up signalling in accordance with the second wake-up signalling format performs a cell selection/reselection procedure.

Paragraph 8. The method of any of paragraphs 1 to 7, wherein monitoring for signalling transmitted by the first network access node in accordance with the first wake-up signalling format and monitoring for signalling transmitted by the second network access node in accordance with the second wake-up signalling format, comprises monitoring for signalling transmitted by the first network access node in accordance with the first wake-up signalling format during a first time period without monitoring for signalling transmitted by the second network access node in accordance with the second wake-up signalling format.

Paragraph 9. The method of paragraph 8, wherein monitoring for signalling transmitted by the second network access node in accordance with the second wake-up signalling format is performed during a second time period which follows the first time period.

Paragraph 10. The method of paragraph 9, wherein the first time period ends in response to the terminal device receiving signalling transmitted by the second network access node in accordance with the first wake-up signalling format with an indication this signalling is from the second network access node and not from the first network access node.

Paragraph 11. The method of paragraph 9 or 10, wherein the second time period is longer than the first time period.

Paragraph 12. The method of any of paragraphs 1 to 11, further comprising the terminal device performing a cell selection/reselection procedure after not detecting wake-up signalling in either one or both of the first and second time periods.

Paragraph 13. The method of any of paragraphs 1 to 12, wherein monitoring for signalling transmitted by the first network access node in accordance with the first wake-up signalling format and monitoring for signalling transmitted by the second network access node in accordance with the second wake-up signalling format are performed at the same time.

Paragraph 14. The method of any of paragraphs 1 to 13, wherein the first wake-up signalling format is a dedicated wake-up signalling format for the first network access node and the second wake-up signalling format is a common wake-up signalling format for a plurality of network access nodes including the second network access node.

Paragraph 15. The method of any of paragraphs 1 to 14, further comprising determining after a time period of monitoring for signalling transmitted by the first network access node in accordance with the first wake-up signalling format and monitoring for signalling transmitted by the second network access node in accordance with the second wake-up signalling format that at least one of the first and second wake-up signalling configuration information is no longer valid, and establishing updated wake-up signalling configuration information in response thereto.

Paragraph 16. The method of any of paragraphs 1 to 15, wherein determining that at least one of the first and second wake-up signalling configuration information is no longer valid comprises determining a predefined validity period for the at least one of the first and second wake-up signalling configuration information has expired.

Paragraph 17. The method of any of paragraphs 1 to 16, wherein determining that at least one of the first and second wake-up signalling configuration information is no longer valid comprises receiving an indication from one of the plurality of network access nodes that predefined validity period for the at least one of the first and second wake-up signalling configuration information has expired.

Paragraph 18. The method of any of paragraphs 1 to 17, further comprising establishing further wake-up signalling configuration information for at least one further network access node, wherein the further wake-up signalling configuration information comprises an indication of at least one further wake-up signalling format to be transmitted by respective ones of the at least one further network access node in advance of transmitting a paging message; and monitoring for signalling transmitted by the at least one further network access node in accordance with the at least one further wake-up signalling format, and seeking to decode a subsequent paging message in response to detecting wake-up signalling in accordance with the at least one further wake-up signalling format.

Paragraph 19. A terminal device for use in a wireless telecommunications system comprising the terminal device and a plurality of network access nodes, wherein the terminal device comprises controller circuitry and transceiver circuitry configured to operate together such that the terminal device is operable to: establish first wake-up signalling configuration information for a first network access node, wherein the first wake-up signalling configuration information comprises an indication of a first wake-up signalling format to be transmitted by the first network access node in advance of transmitting a paging message; establish second wake-up signalling configuration information for a second network access node, wherein the second wake-up signalling configuration information comprises an indication of a second wake-up signalling format to be transmitted by the second network access node in advance of transmitting a paging message; and monitor for signalling transmitted by the first network access node in accordance with the first wake-up signalling format and monitoring for signalling transmitted by the second network access node in accordance with the second wake-up signalling format, and seek to decode a subsequent paging message in response to detecting wake-up signalling in accordance with either the first wake-up signalling format or the second wake-up signalling format. 20. Circuitry for a terminal device for use in a wireless telecommunications system comprising the terminal device and a plurality of network access nodes, wherein the circuitry comprises controller circuitry and transceiver circuitry configured to operate together such that the circuitry is operable to: establish first wake-up signalling configuration information for a first network access node, wherein the first wake-up signalling configuration information comprises an indication of a first wake-up signalling format to be transmitted by the first network access node in advance of transmitting a paging message; establish second wake-up signalling configuration information for a second network access node, wherein the second wake-up signalling configuration information comprises an indication of a second wake-up signalling format to be transmitted by the second network access node in advance of transmitting a paging message; and monitor for signalling transmitted by the first network access node in accordance with the first wake-up signalling format and monitoring for signalling transmitted by the second network access node in accordance with the second wake-up signalling format, and seek to decode a subsequent paging message in response to detecting wake-up signalling in accordance with either the first wake-up signalling format or the second wake-up signalling format.

Paragraph 21. A method of operating a first network access node in a wireless telecommunications system comprising a terminal device and a plurality of network access nodes, wherein the method comprises: establishing first wake-up signalling configuration information for the first network access node, wherein the first wake-up signalling configuration information comprises an indication of a first wake-up signalling format to be transmitted by the first network access node in advance of transmitting a paging message; establishing second wake-up signalling configuration information for a second network access node, wherein the second wake-up signalling configuration information comprises an indication of a second wake-up signalling format to be transmitted by the second network access node in advance of transmitting a paging message; and transmitting to the terminal device an indication of the first and second wake-up signalling configuration information.

Paragraph 22. The method of paragraph 21, wherein establishing second wake-up signalling configuration information for the second network access node comprises receiving an indication of the second wake-up signalling configuration information from the second network access node.

Paragraph 23. The method of paragraph 21, further comprising communicating an indication of the first wake-up signalling configuration information to the second network access node.

Paragraph 24. The method of paragraph 21 or 22, wherein the indication of the first and second wake-up signalling configuration information is transmitted to the terminal device in system information broadcast, SIB, signalling transmitted by the first network access node.

Paragraph 25. The method of any of paragraphs 21 to 24, wherein the indication of the first and second wake-up signalling configuration information is transmitted to the terminal device in radio resource control, RRC, signalling transmitted by the first network access node.

Paragraph 26. The method of any of paragraphs 21 to 25, further comprising the first network access node receiving from a mobile management entity for the wireless telecommunications system a paging request message for the terminal device, and transmitting wake-up signalling for the terminal device in accordance with the first wake-up signalling format and subsequently transmitting a paging message for the terminal device.

Paragraph 27. A first network access node for use in a wireless telecommunications system comprising a terminal device and a plurality of network access nodes, wherein the first network access node comprises controller circuitry and transceiver circuitry configured to operate together such that the first network access node is operable to: establish first wake-up signalling configuration information for the first network access node, wherein the first wake-up signalling configuration information comprises an indication of a first wake-up signalling format to be transmitted by the first network access node in advance of transmitting a paging message;

establish second wake-up signalling configuration information for a second network access node, wherein the second wake-up signalling configuration information comprises an indication of a second wake-up signalling format to be transmitted by the second network access node in advance of transmitting a paging message; and transmit to the terminal device an indication of the first and second wake-up signalling configuration information.

Paragraph 28. Circuitry for a first network access node for use in a wireless telecommunications system comprising a terminal device and a plurality of network access nodes, wherein the circuitry comprises controller circuitry and transceiver circuitry configured to operate together such that the circuitry is operable to: establish first wake-up signalling configuration information for the first network access node, wherein the first wake-up signalling configuration information comprises an indication of a first wake-up signalling format to be transmitted by the first network access node in advance of transmitting a paging message; establish second wake-up signalling configuration information for a second network access node, wherein the second wake-up signalling configuration information comprises an indication of a second wake-up signalling format to be transmitted by the second network access node in advance of transmitting a paging message; and transmit to the terminal device an indication of the first and second wake-up signalling configuration information.

REFERENCES

[1] RP-161464, "Revised WID for Further Enhanced MTC for LTE," Ericsson, 3GPP TSG RAN Meeting #73, New Orleans, USA, Sep. 19-22, 2016
[2] RP-161901, "Revised work item proposal: Enhancements of NB-IoT", Huawei, HiSilicon, 3GPP TSG RAN Meeting #73, New Orleans, USA, Sep. 19-22, 2016
[3] RP-170732, "New WID on Even further enhanced MTC for LTE," Ericsson, Qualcomm, 3GPP TSG RAN Meeting #75, Dubrovnik, Croatia, Mar. 6-9, 2017
[4] RP-170852, "New WID on Further NB-IoT enhancements," Huawei, HiSilicon, Neul, 3GPP TSG RAN Meeting #75, Dubrovnik, Croatia, Mar. 6-9, 2017
[5] Holma H. and Toskala A, "LTE for UMTS OFDMA and SC-FDMA based radio access", John Wiley and Sons, 2009
[6] 3GPP TS 36.304 version 14.2.0 Release 14
[7] 3GPP TS 36.321 version 13.5.0 Release 13
[8] C. Hambeck, et al., "A 2.4 µW Wake-up Receiver for wireless sensor nodes with −71 dBm sensitivity", in IEEE Proceeding International Symposium of Circuits and Systems (ISCAS), 2011, pp. 534-537.

The invention claimed is:

1. A method of operating a network access node in a wireless telecommunications system comprising a terminal device and a plurality of network access nodes, wherein the method comprises:
   establishing first wake-up signalling configuration information, wherein the first wake-up signalling configuration information comprises an indication of a first wake-up signalling format to be transmitted in advance of transmitting a paging message;
   establishing second wake-up signalling configuration information, wherein the second wake-up signalling configuration information comprises an indication of a second wake-up signalling format to be transmitted in advance of transmitting a paging message; and
   transmitting to the terminal device an indication of the first and second wake-up signalling configuration information.

2. The method of claim 1, wherein
   establishing second wake-up signalling configuration information comprises receiving an indication of the second wake-up signalling configuration information from a second network access node.

3. The method of claim 1, further comprising:
   communicating an indication of the first wake-up signalling configuration information to a second network access node.

4. The method of claim 1, wherein
   the indication of the first and second wake-up signalling configuration information is transmitted to the terminal device in system information broadcast (SIB) signalling transmitted by the network access node.

5. The method of claim 1, wherein
   the indication of the first and second wake-up signalling configuration information is transmitted to the terminal device in radio resource control (RRC) signalling transmitted by the network access node.

6. The method of claim 1, further comprising:
   the network access node receiving from a mobile management entity for the wireless telecommunications system a paging request message for the terminal device, and transmitting wake-up signalling for the terminal device in accordance with the first wake-up signalling format and subsequently transmitting a paging message for the terminal device.

7. A network access node for use in a wireless telecommunications system comprising a terminal device and a plurality of network access nodes, wherein the network access node comprises:
   circuitry configured to
      establish first wake-up signalling configuration information, wherein the first wake-up signalling configuration information comprises an indication of a first wake-up signalling format to be transmitted in advance of transmitting a paging message;
      establish second wake-up signalling configuration information, wherein the second wake-up signalling configuration information comprises an indication of a second wake-up signalling format to be transmitted in advance of transmitting a paging message; and
      transmit to the terminal device an indication of the first and second wake-up signalling configuration information.

8. The network access node of claim 7, wherein
   the circuitry is configured to establish the second wake-up signalling configuration information based on an indication of the second wake-up signalling configuration received information from a second network access node.

9. The network access node of claim 7, wherein the circuitry is configured to communicate an indication of the first wake-up signalling configuration information to a second network access node.

10. The network access node of claim 7, wherein the circuitry is configured to transmit the indication of the first and second wake-up signalling configuration information to the terminal device in system information broadcast (SIB) signalling transmitted by the network access node.

11. The network access node of claim 7, wherein the circuitry is configured to transmit the indication of the first and second wake-up signalling configuration information to the terminal device in radio resource control (RRC) signalling transmitted by the network access node.

12. The network access node of claim 7, wherein the circuitry is configured to:
receive, from a mobile management entity for the wireless telecommunications system a paging request message for the terminal device; and
transmit wake-up signalling for the terminal device in accordance with the first wake-up signalling format and subsequently transmit a paging message for the terminal device.

13. Circuitry for a network access node for use in a wireless telecommunications system comprising a terminal device and a plurality of network access nodes, wherein circuitry is configured to:
establish first wake-up signalling configuration information, wherein the first wake-up signalling configuration information comprises an indication of a first wake-up signalling format to be transmitted in advance of transmitting a paging message;
establish second wake-up signalling configuration information, wherein the second wake-up signalling configuration information comprises an indication of a second wake-up signalling format to be transmitted in advance of transmitting a paging message; and
transmit to the terminal device an indication of the first and second wake-up signalling configuration information.

14. The circuitry of claim 13, wherein the circuitry is configured to establish the second wake-up signalling configuration information based on an indication of the second wake-up signalling configuration received information from a second network access node.

15. The circuitry of claim 13, wherein the circuitry is configured to communicate an indication of the first wake-up signalling configuration information to a second network access node.

16. The circuitry of claim 13, wherein the circuitry is configured to transmit the indication of the first and second wake-up signalling configuration information to the terminal device in system information broadcast (SIB) signalling transmitted by the network access node.

17. The circuitry of claim 13, wherein the circuitry is configured to transmit the indication of the first and second wake-up signalling configuration information to the terminal device in radio resource control (RRC) signalling transmitted by the network access node.

18. The circuitry of claim 13, wherein the circuitry is configured to:
receive, from a mobile management entity for the wireless telecommunications system a paging request message for the terminal device; and
transmit wake-up signalling for the terminal device in accordance with the first wake-up signalling format and subsequently transmit a paging message for the terminal device.

\* \* \* \* \*